United States Patent [19]

Ardon et al.

[11] Patent Number: 5,105,420
[45] Date of Patent: Apr. 14, 1992

[54] METHOD AND APPARATUS FOR RECONFIGURING INTERCONNECTIONS BETWEEN SWITCHING SYSTEM FUNCTIONAL UNITS

[75] Inventors: Menachem T. Ardon; Gustavus H. Zimmerman, III, both of Naperville, Ill.

[73] Assignee: AT&T Bell Laboratories, Murry Hill, N.J.

[21] Appl. No.: 506,403

[22] Filed: Apr. 9, 1990

[51] Int. Cl.⁵ .................... H04Q 11/04; G06F 11/20
[52] U.S. Cl. ...................................... 370/16; 370/54; 370/58.3; 379/221; 379/269; 371/8.2; 371/11.2; 340/827
[58] Field of Search ............... 370/16, 53, 54, 58.1, 370/58.2, 58.3, 63, 66, 67, 85.1, 110.1; 379;/219, 220, 221, 242, 258, 268, 269, 271, 272, 273; 371/7, 8.1, 8.2, 9.1, 11.1, 11.2; 340/825.03, 825.06, 826, 827

[56] References Cited

U.S. PATENT DOCUMENTS

| | | | |
|---|---|---|---|
| 3,964,056 | 6/1976 | Charpentie | 371/11.2 |
| 4,322,843 | 3/1982 | Beuscher et al. | 370/63 |
| 4,442,502 | 4/1984 | Friend et al. | 370/58.2 |
| 4,550,404 | 10/1985 | Chodrow et al. | 370/110.1 |
| 4,566,094 | 1/1986 | Ardon et al. | 370/58.1 |
| 4,575,839 | 3/1986 | Ogata et al. | 370/58.1 |
| 4,683,584 | 7/1987 | Chang et al. | 379/269 |
| 4,700,340 | 10/1987 | Beranek et al. | 370/16 |
| 4,710,926 | 12/1987 | Brown et al. | 371/9 |
| 4,713,811 | 12/1987 | Frey | 371/9.1 |
| 4,791,639 | 12/1988 | Afheldt et al. | 370/58.1 |
| 4,805,166 | 2/1989 | Ardon et al. | 370/54 |

OTHER PUBLICATIONS

Northern Telecom Marketing Bulletins dated Oct. 12, 1989, entitled, "S/DMS AccessNode Residential Fiber Access Applications", Fiber World Wire Central Consolidation, S/DMS TransportNode, S/DMS AccessNode Business Access Applications, S/DMS SuperNode System, S/DMS SuperNode Remote Access in the FiberWorld, FiberWorld SERVICES, FiberWorld Operations, Administration, Maintenance & Provisioning, SONET Overview.

(List continued on next page.)

Primary Examiner—Douglas W. Olms
Assistant Examiner—Alpus H. Hsu
Attorney, Agent, or Firm—E. E. Pacher

[57] ABSTRACT

An illustrative method and structural arrangement for reconfiguration of switching system functional units where although the distributed control entities and the distributed switch units of a switching system are in fixed association, the association between peripheral circuits and the control and switch units is not fixed. Rather a group of peripheral circuits is connectable to at least first and second ones of the distributed switch units. When the group of peripheral circuits is connected to the first distributed switch unit, the control unit associated with the first distributed switch unit processes calls to and from the group of peripheral circuits. When the group of peripheral circuits is connected to the second distributed switch unit in response to a reconfiguration signal, the control unit associated with the second distributed switch unit processes calls to and from the group. In particular embodiments, the selective connection of the group of peripheral circuits to different distributed switch units is effected by an interconnection arrangement used to interconnect the switching system and a multiplex of communication circuits from a transmission facility. In one embodiment the interconnection arrangement is implemented using a digital access and crossconnect system (DACS), and in a second embodiment, using a plurality of add/drop multiplexers interconnected in a fiber ring.

28 Claims, 7 Drawing Sheets

OTHER PUBLICATIONS

Northern Telecom Product Announcements dated Oct. 12, 1989, entitled, "Northern Telecom Introduces Sonet-Based DMS Supermode Product Family", Northern Telecom Introduces Sonet-Based Fiber Transport System, Northern Telecom Introduces Sonet-Based Fiber Access System, Background Information-The Technology Behind FiberWorld.

New Release-Northern Telecom Introduces, "Fiberworld" Family of Fiber Optic Transmission/Switching Products-dated Oct. 12, 1989.

Copies of slides dated Oct. 10, 1989, entitled "Fiber World".

Copies of slides dated Oct. 9, 1989 and Oct. 10, 1989, entitled "The Products" by John Taylor.

*Northern Telecom Introduces FiberWorld*, dated Nov. 1989.

AT&T 365-301-004 "DACS IV (Digital Access and Crossconnect SyYstem IV)".

*AT&T Technical Journal*, Jul.-Aug., 1985, vol. 64, Part 2.

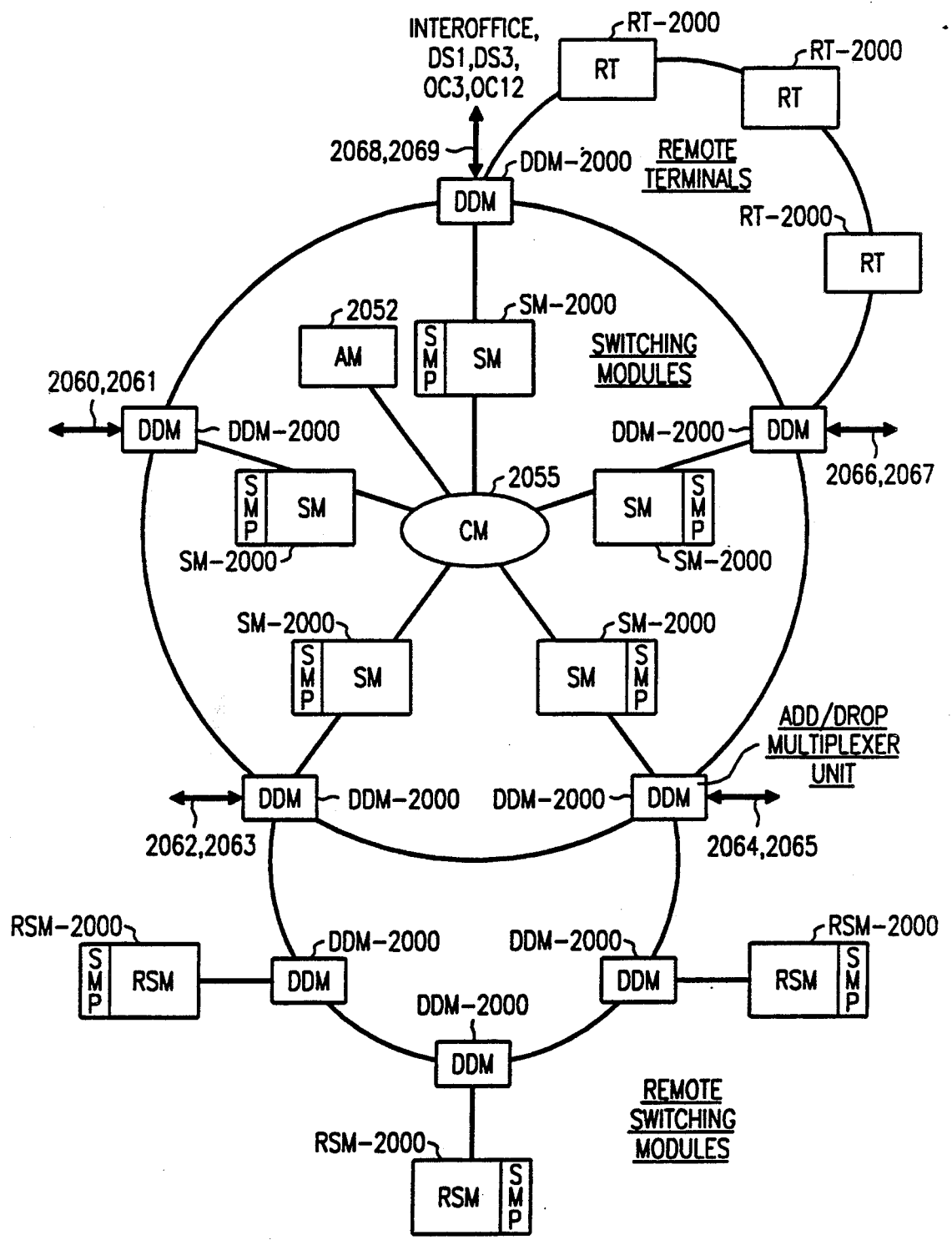

METHOD AND APPARATUS FOR RECONFIGURING INTERCONNECTIONS BETWEEN SWITCHING SYSTEM FUNCTIONAL UNITS

CROSS-REFERENCE TO RELATED APPLICATION

This application is related to application of J. R. Colton et al. application Ser. No. 07/507,099 filed concurrently herewith and assigned to the same assignee as the prevent invention. A continuation-in-part application of J. R. Colton et al. application Ser. No. 07/617477 was filed on Nov. 20, 1990, and allowed on Mar. 25, 1991; parent application Ser. No. 07/425641 was abandoned.

TECHNICAL FIELD

This invention relates to telecommunications.

BACKGROUND AND PROBLEM

High reliability is customarily achieved in switching system designs by duplication critical elements. As an alternative to full duplication, an n+1 sparing design has been used in some switching systems in which one unit (e.g., a time-slot interchange unit or a memory unit) is designated as the spare for N associated active units. With such a design approach, the spare unit is provided with special connections to the associated units and can be controlled to temporarily perform the functions of one of the associated units. In the arrangement of U.S. Pat. No. 4,700,340 issued to A. J. Beranek et al. on Oct. 13, 1987, a plurality of identical switching circuits are provided, including a plurality of spare switching circuits, for serving subscriber terminals connected via communication lines. A logical address is stored for each active switching circuit, as well as the physical designation of all switching circuits. A data distribution operating under control of control data selectively distributes data packets from the communication lines to the active switching circuits. In the Beranek arrangement, a single control processor, which is responsible for the set of active and spare switching circuits, is responsive to change control signals identifying an active switching circuit, to store the logical address assigned to the identified active circuit in correspondence with a selected spare circuit in the memory of the single control processor, there by designating the latter circuit as active. The single processor further transfers control data to the distribution circuit to control distribution of data packets to the selected switching circuit which has been designated to be active. System programs may employ logical addresses for the switching circuits and any reassignment of the physical circuits does not require a corresponding change in system programs. Although the Beranek arrangement achieves flexibility and convenience in reconfiguring a plurality of units under the control of a single control processor, the problem is substantially more difficult when the units to be reconfigured are under the control of a plurality of distributed control entities.

U.S. Pat. No. 4,710,926 issued to D. W. Brown et al. on Dec. 1, 1987, discloses a distributed control switching system having a plurality of processor modules (referred to as processors) that are interconnected by a bus. Line processors serve corresponding user teleterminals, and call control processors are used to direct the various phases of call processing in a switching system. A message called a heartbeat is broadcast among the processors once during each major processing cycle. The heartbeat message indicates the physical and logical identity of the transmitting processor with respect to the system arrangement as well as the processor's present operational state. By monitoring the heartbeats from other processors, spare processors can autonomously take over the functions of failed processors without being required to consult or obtain the approval of an executive processor. The new physical location of a replaced processor will be automatically recorded by the other processors. The Brown arrangement provides for ready reconfigurations because there is no fixed association between call control processors and line processors. However, since the switching mechanism is based on a simple bus rather than one a network of distributed switching units, the capacity of the switching system in terms of the number of lines and trunks that can be effectively served is limited.

The AT&T switching system disclosed in the AT&T Technical Journal, July-Aug. 1985, Vol. 64, No. 6, Part Two, advantageously combines distributed control and distributed switching. The hardware architecture has three major components: an administrative module (AM), a communications module (CM), and one or more switching module (SMs). The AM provides the system-level interfaces required to operate, administer, and maintain the switching system. It performs functions that can most economically be done globally, such as common resource allocation and maintenance control. The basic function of the CM is to provide consistent communication between the SMs, and between the AM and the SMs. The CM includes a message switch which transfers call processing and administrative messages between the SMs and the AM, and between any two SMs. The CM further includes a time-multiplexed switch comprising a single-stage switching network that provides the digital paths for switched connections between the modules and for control messages among the modules. SMs provide call-processing intelligence, the first stage of switching network, and line and trunk units. The SMs represent distributed switching units. Each SM includes a switching module processor (SMP) which controls call processing, call distribution, and maintenance functions. The SMPs represent distributed control units. However, once the lines and trunks of the system are connected to SMs, there is no possibility of balancing the load between MSs. Accordingly, one SM may be taxed because of the processing requirements being placed on its SMP while another is limited because of the time-slot capacity of its time-slot interchange unit. Although the SMPs and time-slot interchange units are duplicated, the peripheral circuits (lines or trunks) served by a given SM are necessarily taken out of service upon a failure of duplicated units, even though other SMs and SMPs are fully functional and, perhaps, underloaded. Flexible reconfiguration has heretofore not been possible because the association between peripheral circuits, SMPs, and SM time-slot interchange units has been fixed.

In view of the foregoing, a need exists in the art for flexible reconfiguration of switching system functional units, particularly in systems combining distributed control and distributed switching.

Solution

This need is met and a technical advance is achieved in accordance with the principles of the invention in an illustrative method and structural arrangement where although the distributed control entities and the distributed switch units of a switching system are in fixed association, the association between peripheral circuits and the control and switch units is not fixed. Rather a group of peripheral circuits is connectable to at least first and second ones of the distributed switch units. When the group of peripheral circuits is connected to the first distributed switch unit, the control unit associated with the first distributed switch unit processes calls to and from the group of peripheral circuits. Such call processing includes controlling call signaling communication with the group, controlling the establishment of switched connections in the first distributed switch unit to and from the group, and cooperating with other of the distributed switch unitsto extend switched connections thofrugh other of the distributed switch units. When the group of peripheral circuits is connected to the second distributed switch unit in response to a reconfiguration signal, the control unit associated with the second distributed switch unit processes calls to and from the group. In particular embodiments, the selective connection of the group peripheral circuits to different distributed switch units is effected by an interconnection arrangement used to interconnect the switching system and a multiplex of communication circuits from a transmission facility. In one embodiment the interconnection arrangement is implemented using a digital access and crossconnect system (DACS), and in a second embodiment, using a plurality of add/drop multiplexers interconnected in a fiber ring.

A switching system (e.g., FIG. 6) in accordance with the invention serves a plurality of peripheral circuits and includes switching means comprising a plurality of distributed switch units, and control means comprising a plurality of distributed control units each associated with one of the distributed switch units. The system further includes a connection means to selectively connect a group of the peripheral circuits to one of at least first and second ones of the distributed switch units, where the first and second distributed switch units are associated with first and second distributed control units, respectively. The system includes memory facilities storing data enabling the first distributed control unit to process calls to and from the group of peripheral circuits when the connection means connects the group of peripheral circuits to the first distributed switch unit. The stored data also enable the second distributed control unit to process calls to and from the group of peripheral circuits when the connection means connects the group of peripheral circuits to the second distributed switch unit.

An illustrative method of the invention is used in a central office wire center CO-2000 (FIGS. 4a and 4b) including an interconnect arrangement (DNU 2059) terminating transmission facilities (2060, 2070) and further including a switching system comprising a plurality of units including peripheral units (AIUs, TIUs) for interfacing peripheral circuits (lines, trunks) with the switching system. The plurality of units also includes a switching units (TSIUs 2031, 2032) for providing switched communication among the peripheral circuits in response to calls to and from the peripheral circuits. According to the method, the interconnect arrangement interconnects the switching system and at least one multiplex of circuits (e.g. a DS1 multiplex comprising 24 circuits) of at least one of the transmission facilities. The interconnect arrangement also interconnects ones of the units of the system, and reconfigures the interconnection of units to perform load balancing or fault recovery. For example, the interconnect arrangement may interconnect a peripheral unit (AIU 2117) and a first switching unit (TSIU 2031) for switching calls to and from peripheral circuits (lines 2118). The interconnect arrangement then reconfigures the interconnection of units such that the peripheral unit (AIU 2117) and a second switching unit (TSIU 2032) are interconnected. The interconnect arrangement and the switching system are under common control.

An illustrative method of the invention is usable in an arrangement comprising first and second switching systems (50, 70) (FIG. 8) having a transmission facility (60) interposed therebetween. The first switching system (50) includes a first switching network (52) for providing switched connections between ones of a plurality of first peripheral circuits (lines 55). The first switching system further includes a first system control (51) for controlling the first switching network. The second switching system (70) includes a second switching network (72) for providing switched connections between ones of a plurality of second peripheral circuits (lines 75). The second switching system further includes a second system control (71) for controlling the second switching network. In response to a reconfiguration signal (received on link 57 from system control 51), a group of the first peripheral circuits (lines 55) ar connected via the transmission facility (60) to the second switching network (72) (not through the first switching network (52)). The second system control (71) processes calls to and from the group of first peripheral circuits (line 55), including controlling call signaling communication with the group of first peripheral circuits, and controlling the establishment of switched connections in the second switching network (72) to and from the group of first peripheral circuits.

BRIEF DESCRIPTION OF THE DRAWING

FIG. 5 is a diagram of an add/drop fiber ring architecture where the interconnection arrangement is implemented using add/drop multiplexers connected in a fiber ring in a distributed architecture rather than using a DACS;

DETAILED DESCRIPTION

Figure 4:
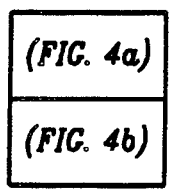
FIGS. 4a and 4b, arranged in accordance with FIG. 4, comprise a diagram illustrating modifications and additions to the switching system of FIGS. 1-3 to provide the integration of an interconnection arrangement (a DACS) with a switching system, under a common control structure, in a central office wire center CO-2000.
Figure 4A:
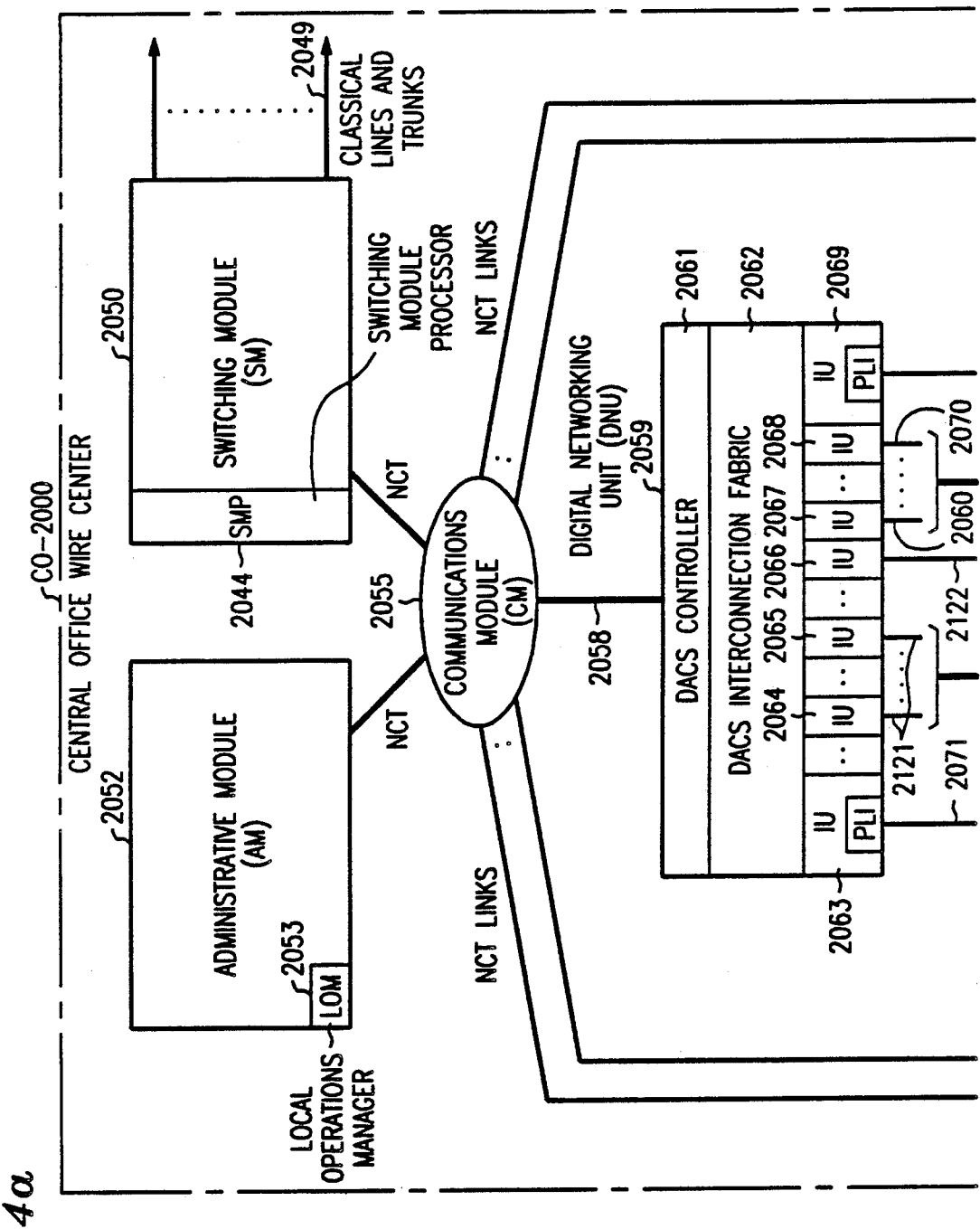
Figure 4B:
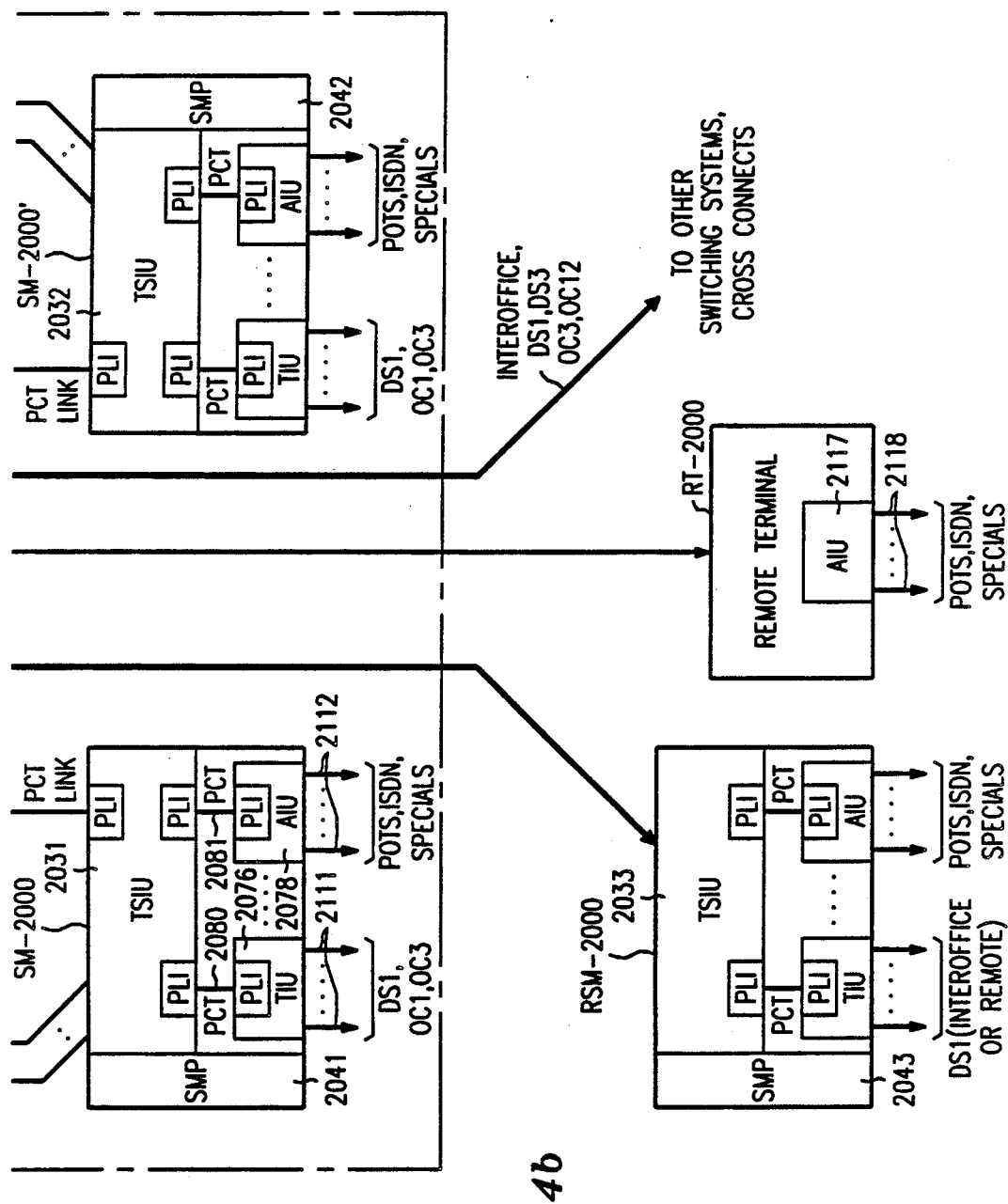

The description which follows relates to the integration of an interconnection arrangement. e.g., a DACS, with a local central office switching system. In the specific embodiment described, the interconnection arrangement is based generally on the AT&T DACS IV digital access and crossconnect system described in the publication AT&T 365-301-004 "DACS IV (Digital Access and Crossconnect System IV); the central office switching system is based generally on the AT&T 5ESS® Switch described in the AT&T Technical Journal, July-August 1985, Vol. 64, No. 6, Part 2. The description is arranged in four parts: (1) the AT&T 5ESS Switch is described as it exists in the prior art; (2) modifications and additions to the 5ESS Switch are then described which provide the integration of an interconnection arrangement with a switching system, under a common control structure, in a central office wire center CO-2000 (FIGS. 4a and 4b); (3) a further embodiment (FIG. 5) is described where the interconnection arrangement is implemented using add/drop multiplexers connected in a fiber ring in a distributed architecture rather than using a DACS; and (4) the reconfiguration of interconnections between switching system functional units for load balancing and fault recovery is then described.

Prior Art System 1000

Figure 1:
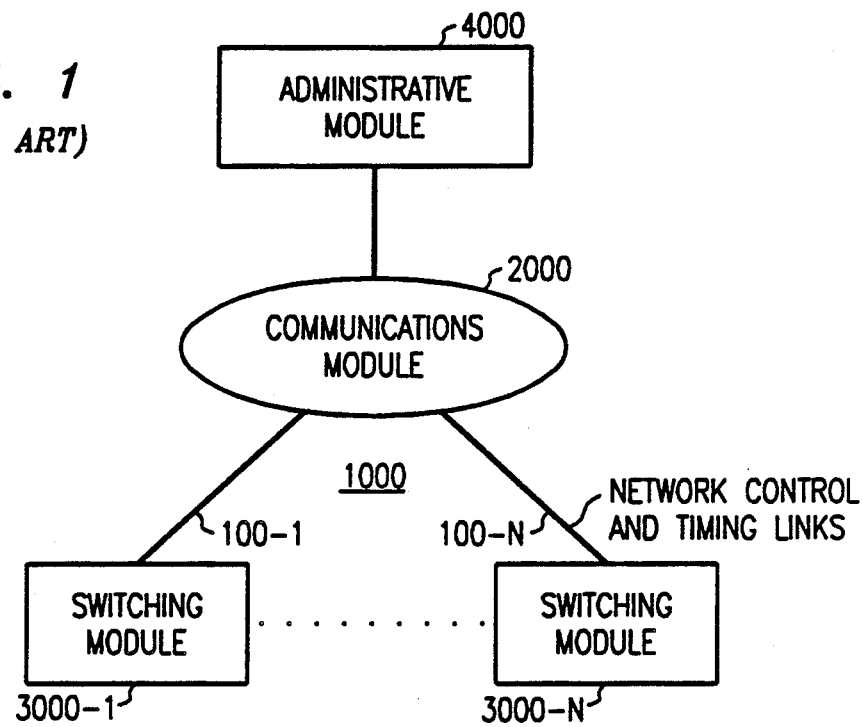
FIGS. 1-3 are diagrams of a prior art switching system.
Figure 2:
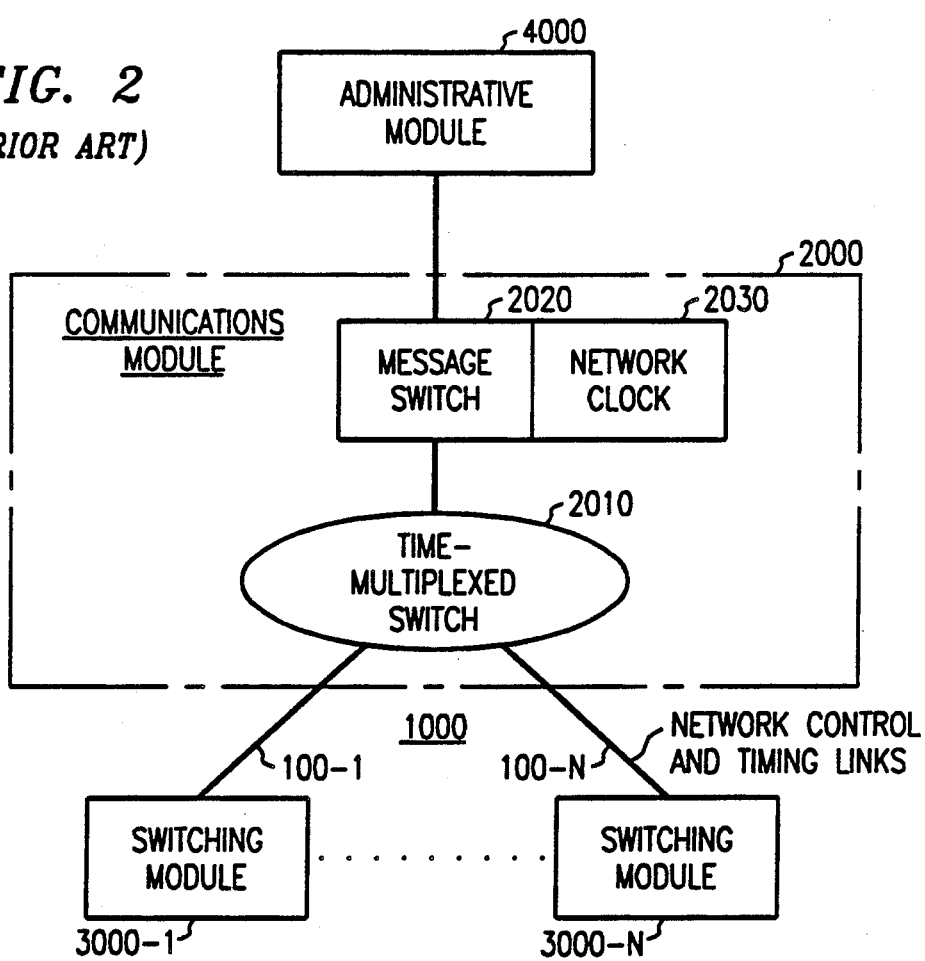
Figure 3:
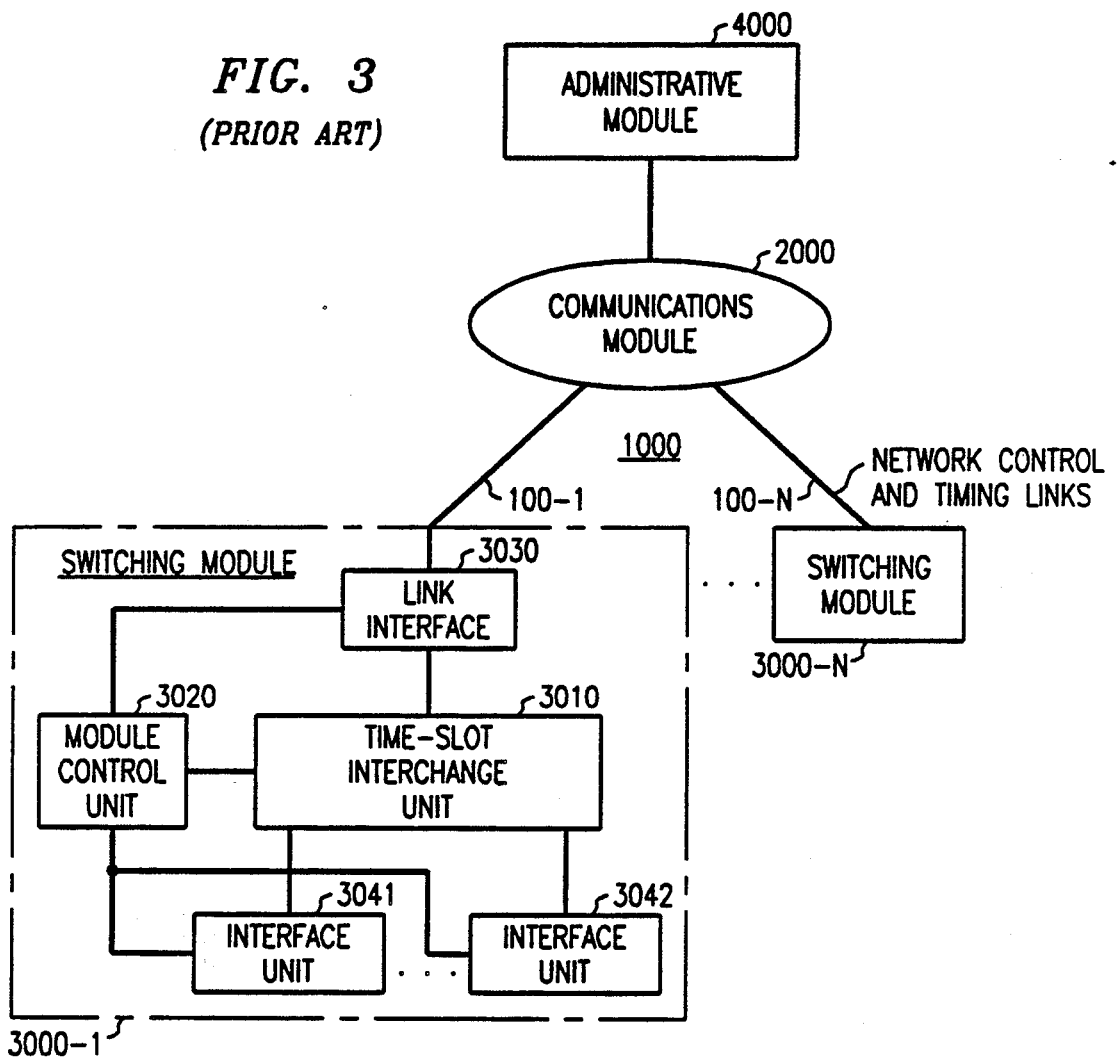

FIGS. 1-3 are used to describe the prior art switching system 1000. U.S. Pat. No. 4,322,843 issued to H. J. Beuscher et al. on Mar. 30, 1982 and U.S. Pat. No. 4,683,584 issued to S. Chang et al. on July 27, 1987 describe aspects of the system in detail.

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplication processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

The basis function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgment, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000). Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCTY time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N being transmitting a logic one E-bit in the particular time slot as a continuity signal and both also being scanning the E-bit of the particular time slot received from the other SM. The call setup procedure is not considered complete until both SM 3000-1 and SM 3000-N have detected the E-bit continuity signal from the other SM.

SMs such as SM3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

Central Office Wire Center CO-2000

FIGS. 4a and 4b comprise a diagram of an architecture for a central office wire center CO-2000 where a switching system and a DACS are integrated under the common control of an administrative module (AM) 2052. In FIGS. 4a and 4b, the DACS functionality is implemented by a digital networking unit (DNU) 2059. The other elements in FIGS. 4a and 4b are elements of a switching system based on the architecture of system 1000 (FIG. 1) but with modifications and additional as described herein.

CO-2000 includes one or more switching modules, SM-2000, SM-2000', which, line the conventional switching modules of the prior art system, perform time-switching functions under the control of a distributed module control unit or switching module processor (SMP) 2041, 2042. However, switching modules SM-2000 and SM-2000' are substantially larger than conventional switching modules and can switch approximately 16K peripheral time slots and 16K network time slots. Also included as part of the switching system is a remote switching module RSM-2000, controlled by SMP 2043, and a remote terminal RT-2000, both located at a distance from CO-2000, and interconnected with CO-2000 via fiber links 2121 and 2122. Conventional switching modules such as SM 2050 controlled by SMP 2044 and providing service to lines and trunks 2049, may also be included in the same system.

SM-2000 includes a time-slot interchange unit (TSIU) 2031 which switches time slots between interface units connected via peripheral control and timing (PCT) links 2080, 2081, 2071, and connects time slots from the peripheral interface units to time slots on network control and timing (NCT) links 2056 to communications module 2055. Access interface unit (AIU) 2078 provides the system interface to lines 2112 including POTS (plain old telephone service), ISDN (integrated services digital network) and special lines 2112. AIU 2078 provides the typical functionality (battery, overvoltage, ringing, supervision, coding/decoding, hybrid, testing) for analog lines, and terminates the standard B and D channels for ISDN lines. Special lines include lines to private branch exchanges, foreign exchanges, etc. Trunk unit (TIU) 2076 provides the system interface to trunks 2111 at DS1 and OC-1/OC-3 rates (Table 1). The PCT links are terminated at both ends by peripheral link interfaces (PLIs). Note that DNU 2059 is connected as a peripheral unit.

TABLE 1

| TRANSMISSION RATES |
| --- |
| DS-0 = 1 voice circuit = 64 kb/s |
| DS-1 = 24 voice circuits = 1.544 Mb/s |
| DS-3 = 672 (28 × 24) voice circuits = 44.736 Mb/s |
| OC-1 = 672 voice circuits = STS-1 = 51.84 Mb/s |
| OC-3 = 2016 (3 × 672) voice circuits = STS-3 = 155.520 Mb/s |
| OC-12 = 8064 (4 × 2016) channels = STS-12 = 622.080 Mb/s |
| VT1.5 = 1.728 Mb/s Sonet envelope containing a DS1 rate signal. |

In the present exemplary embodiment, the NCT and PCT fiber optic links transmit data at an OC-3 rate and each comprise 2016 time slots. (Alternatively, three links at an OC-1 rate may replace one link at an OC-3 rate.) The number of NCT links is engineered dependent on the amount of inter-module traffic. SM-2000 can connect any of its peripheral time slots to any other peripheral time slot, or to any of the network time slots on NCT links 2056. Within CM 2055, a given NCT link 2056 is divided into lines each comprising 256 time slots, for switching by a time-multiplexed, space-division switch to the other switching modules.

DNU 2059, based on the above-referenced DACS IV, includes a DACS controller 2061, which operates in response to commands from AM 2054 via CM 2055 and data link 2058, to control the operation of a DACS interconnection fabric 2062. Fabric 2062 has a plurality of ports and provides crossconnections between ports at DS1, DS3, OC-3 and OC-12 rates, for example, among interface units such as units 2063-2069. DNU 2059 is used to perform conventional crossconnection functions, performed by separate DACS systems in the prior art, such as interconnecting DSs between other switching systems and crossconnect systems. DNU 2059 also interconnects DS1 multiplexes from transmission facilities 2060, 2070 via PCT links to SM-2000 and SM-2000' for DS0 switching. In some applications, all inter-office trunks may be received by DNU 2059 rather than by TIUs within SM-2000 or SM-2000'. DNU 2059 is also used to interconnect remote terminal RT-2000,. via a fiber link 2122 in accordance with Bellcore Technical Reference TR303, with SM-2000. The number of PCT links between DNU 2059 and SM-2000 is engineered based on the required traffic.

DNU 2059 is usable to provide semi-permanent connectivity between SM-2000 and SM-2000' for use in handling some of the inter-module call traffic, without requiring the use of the individually switched connections through CM 2055. For example, in one alternative all inter-module calls are routed through DNU 2059, and CM 2055 is used only when the semi-permanent connectivity through DNu 2059 is all being used for other calls.

RT-2000 includes an AIU 2117 for interfacing POTS, ISDN, and special lines 2118 with time slots on link 2122. AIU 2117 has time slot interchange capability such that a group of 24 special lines, for example, are combined within a single DS1 multiplex on link 2122 and crossconnected by DNU 2059 with a transmission facility to another switching system, without being switched through SM-2000. Lines 2118 may include metallic and/or optical fiber lines. AIU 2117 operates as a digital loop carrier system in the manner of the AT&T SLC ® carrier systems. All the circuits from RT-2000 that ar to be individually switched by SM-2000 are crossconnected via fabric 2062 to interface unit 2063, which performs framing functions and terminates a derived data link for control messages from AIU 2117. Interface unit 2063 also performs overhead processing for SONET streams received via facilities 2060, 2070. The message processing from such streams is performed by SMP 2041.

RSM-2000, which is substantially identical to SM-2000, is connected via fiber links 2121 and DNU 2059 to SM-2000 which operates as a host switching module in the manner described in U.S. Pat. No. 4,550,404 issued to M. M. Chodrow et al., on Oct. 29, 1985. Alternatively, RSM-2000 may be connected directly via links 2121 to CM 2055 for operation as an optical remote module.

Am 2052 performs the functions of AM 4000 (FIG. 1) of the prior art system, and further includes a processor referred to as a local operations manager (LOM) 2053 to interface operations support systems (OSSs) for both switching systems and crossconnect systems as well as to the craft interface used in controlling, in an integrated fashion, the operations, administration, maintenance, and provisioning (OAM&P) functions, for both the switching system and the interconnect arrangement (DNU 2059).

An illustrative method is used in a central office wire center CO-2000 (FIGS. 4a and 4b) including an interconnect arrangement (DNU 2059) terminating transmission facilities (2060, 2070), and further including a switching system including peripheral units (AIUs, TIUs) for interfacing peripheral circuits (lines, trunks) with the switching system. The switching system also includes switching units (TSIUs 2031, 2032) for providing switched communication among the peripheral circuits in response to calls to and from the peripheral circuits. The wire center further includes a control means (AM 2052) common to the interconnect arrangement and the switching system. In response to the control means, the interconnect arrangement interconnects the switching system and at least one multiplex of circuits (e.g., a DS1 multiplex comprising 24 circuits) of at least one of the transmission facilities. Also in response to the control means, the switching system establishes calls to and from individual circuits of that multiplex.

The interconnect arrangement also interconnects units of the switching system. For example, the interconnect arrangement interconnects a peripheral unit (AIU 2117) at a remote terminal (RT-2000) and a switching unit (TSIU 2031) at the central office wire center. Alternatively, the interconnect arrangement interconnects a peripheral unit and a switching unit that are both located at the central office wire center. The interconnect arrangement is usable to interconnect two switching units, e.g., a host switching unit (TSIU 2031) at the central office wire center and a remote switching unit (TIS 2033) at a distance from the wire center, or two distributed switch units (TSIUs 2031, 2032) at the wire center. The switching system further includes a central switch (CM 2055) for providing switched communication between different switching units (TSIUs 2031, 2032).

An illustrative combination comprises a switching system, an interconnect means (DNU 2059), and control means (AM 2052) common to the switching system and the interconnect means. The switching system selectively interconnects ones of a plurality of communication circuits (DS0 circuits). The interconnect means selectively interconnects ones of a plurality of communication multiplexes (e.g., DS1 multiplexes each comprising 24 DS0 circuits). A first of the multiplexes (a DS1 on PCT link 2071) is connected to the switching system. The control means controls both the interconnection by the interconnect means of ones of the multiplexes, and the establishment by the switching system of calls to and from individual ones of the circuits of the first multiplex.

The control means includes a common operations, administration, maintenance, and provisioning system for the switching system and the interconnect means. The interconnect means has a plurality of ports (connected to IUs 2063-2069) and interconnect control means (DACS controller 2061) for controlling the interconnection of the ports. The interconnect means and the switching system are colocated at a central office wire center (CO-2000).

A second multiplex (a DS1 on link 2122) conveys information to and from peripheral communication circuits (lines 2118). The control means controls the interconnection by the interconnect means of the first and second multiplexes, and the establishment by the switching system of calls to and from individual ones of the peripheral circuits via the first multiplex, the interconnect means, and the second multiplex.

A third multiplex (a DS1 on link 2060) and a fourth multiplex (a DS1 on link 2070) are not connected to the switching system. The control means controls the interconnection of the third and fourth multiplexes. The third and fourth multiplexes may be connected to other switching systems and interconnect means that are independent of the control means.

Add/Drop Fiber Ring Architecture

FIG. 5 is a diagram of an alternative to the architecture of FIGS. 4a and 4b. In FIG. 5, the function of the interconnect arrangement, (performed by DNU 2059 in FIGS. 4a and 4b) is performed by a plurality of add/drop multiplexer units DDM-2000 interconnected in a ring. In the present example, the ring operates at an OC-12 rate. A multiplexer unit DDM-2000 is used to receive transmission facilities. e.g., 2060, 2061, at DS1, DS3, OC-3 and OC-12, and performs bandwidth shedding, add/drop multiplexing, and SONET overhead processing as required. The add/drop functionality of a particular unit DDM-2000 is programmed by the SMP of the associated SM-2000, under the overall control of AM 2052. DS1 multiplexes received on transmission facilities 2060-2069, or from remote terminals RT-2000 or remote switching modules RSM-2000, are connectable via the ring to any one of the SM-2000s for switching. The crossconnection of multiplexes may be performed within the DDM-2000s or the SM-2000s.

Reconfiguration

The principles of the invention are described in the following manner. First the reconfiguration of functional units is described in general terms with reference to an illustrative switching system 10 (FIG. 6) which combines both distributed switching and distributed control. The relationship between switching system 10 and the illustrative central office wire center CO-2000 (FIGS. 4a and 4b) is then discussed as well as the specific reconfiguration methods used in wire center CO-2000. Reconfiguration among multiple switching systems (FIG. 8) is then described.

Switching system 10 (FIG. 6) serves a plurality of peripheral circuits, e.g., lines 23 and trunks 24 as well as trunks receivable, for example, via a DS1 multiplex of circuits on transmission facility 29. System 10 includes a plurality of distributed switch units 11, 12, 13. The control structure of system 10 includes a central control 26 and a plurality of distributed control units 14, 15, 16 each associated with one of the distributed switch units. System 10 further includes peripheral interface units 21 and 22 for interfacing peripheral circuits. e.g., lines 23 and trunks 24, with system 10.

A central switch 25 provides switched connections between different ones of the distributed switch units 11, 12, 13. Central control 26, which provides administrative functions for system 10, may also be to control central switch 25. Alternatively, central switch 25 is controlled by the distributed control units 14, 15, 16.

An interconnection arrangement 20 selectively connects the peripheral interface units 21, 22 to the distributed switch units 11, 12, 13. For example, at system initialization, peripheral interface units 21 may be connected to distributed switch unit 11. Distributed control unit 14 then controls the processing of calls to and from lines 23. Such call processing includes controlling call signaling communication, e.g., alerting, answering, etc. with lines 23, and controlling the establishment of switched connections in distributed switch unit 11 to and from lines 23. For calls between lines 23 and other lines and trunks connected to other distributed switch units, distributed control unit 14 cooperates with other distributed control units to extend switched connections through other distributed switch units.

Assume that central control 26 determines that a reconfiguration would be desirable such that lines 23 are connected to distributed switch unit 12 rather than distributed switch unit 11. The determination may be made to effect load balancing in terms of processing load between distributed control units 14 and 15 or in terms of switching element resources, e.g., time slots, between distributed switch units 11 and 12, or to provide fault recovery in the event of a failure of distributed control unit 14 or distributed switch unit 11. Central control 26 generates a reconfiguration signal, which in the present example, is transmitted via central switch 25 and a data link 28 to interconnection arrangement 20. Interconnection arrangement 20 responds by connecting peripheral interface unit 21 to distributed switch unit 12. Thereafter, distributed control unit 15 controls the processing of calls to and from lines 23. Such call processing includes controlling call signaling communication, e.g., alerting, answering, etc., with lines 23, and controlling the establishment of switched connections in distributed switch unit 12 to and from lines 23. For calls between lines 23 and other lines and trunks connected to other distributed switch units, distributed control unit 15 cooperates with other distributed control units to extend switched connections through other distributed switch units.

Figure 7:
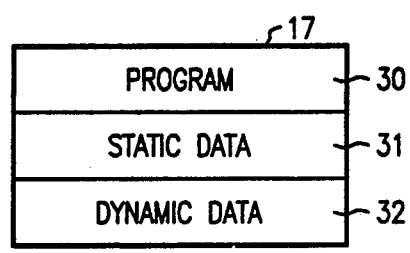
FIG. 7 is a block diagram of memory facilities included in the switching system of FIG. 6.

The distributed control units 14, 15, 16 include memory facilities 17, 18, 19. Memory 17 (FIG. 7), for example, includes blocks 30, 31, and 32, for storing programs, static data, and dynamic data. Static data block 31 stores, for example, logical/physical translation data needed for cooperatively processing calls with other distributed control units. For economy of memory space, each distributed control unit only stores static data sufficient to process calls to and from peripheral circuits connected to the associated distributed switch unit and to cooperate with the other distributed control units in processing inter-switch-unit calls (call which are switched through two distributed switch units). However, a memory facility 27 included in central control 26 stores all such data for system 10. When a reconfiguration is to be effected, central control 26 modified the static data in the memories of the distributed control units as required. Alternatively, all data required for possible reconfigurations could be stored by each of the distributed control units.

It is to be noted that some peripheral interface units may be selectively connectable via interconnection arrangement 20 to multiple distributed switch units, while other peripheral interface units are directly connected to distributed switch units.

A reconfiguration capability in accordance with the invention is included in the architecture of central office wire center CO-2000 (FIGS. 4a and 4b). AIU 2117 is initially connected via DNU 2059 to TSIU 2031. Calls to and from lines 2118 are processed by SMP 2041. In response to a requirement for load balancing or fault recovery, AM 2052 generates a reconfiguration signal. DNU 2059 receives that signal via CM 2055 and data link 2058 and responds by connecting AIU 2117 instead to TSIU 2032. Calls to and from lines 2118 are then processed b SMP 2042. The relationship between elements of switching system 10 (FIG. 6) and CO-2000 (FIGS. 4a and 4b) is given by Table 2.

TABLE 2

Figure 6:
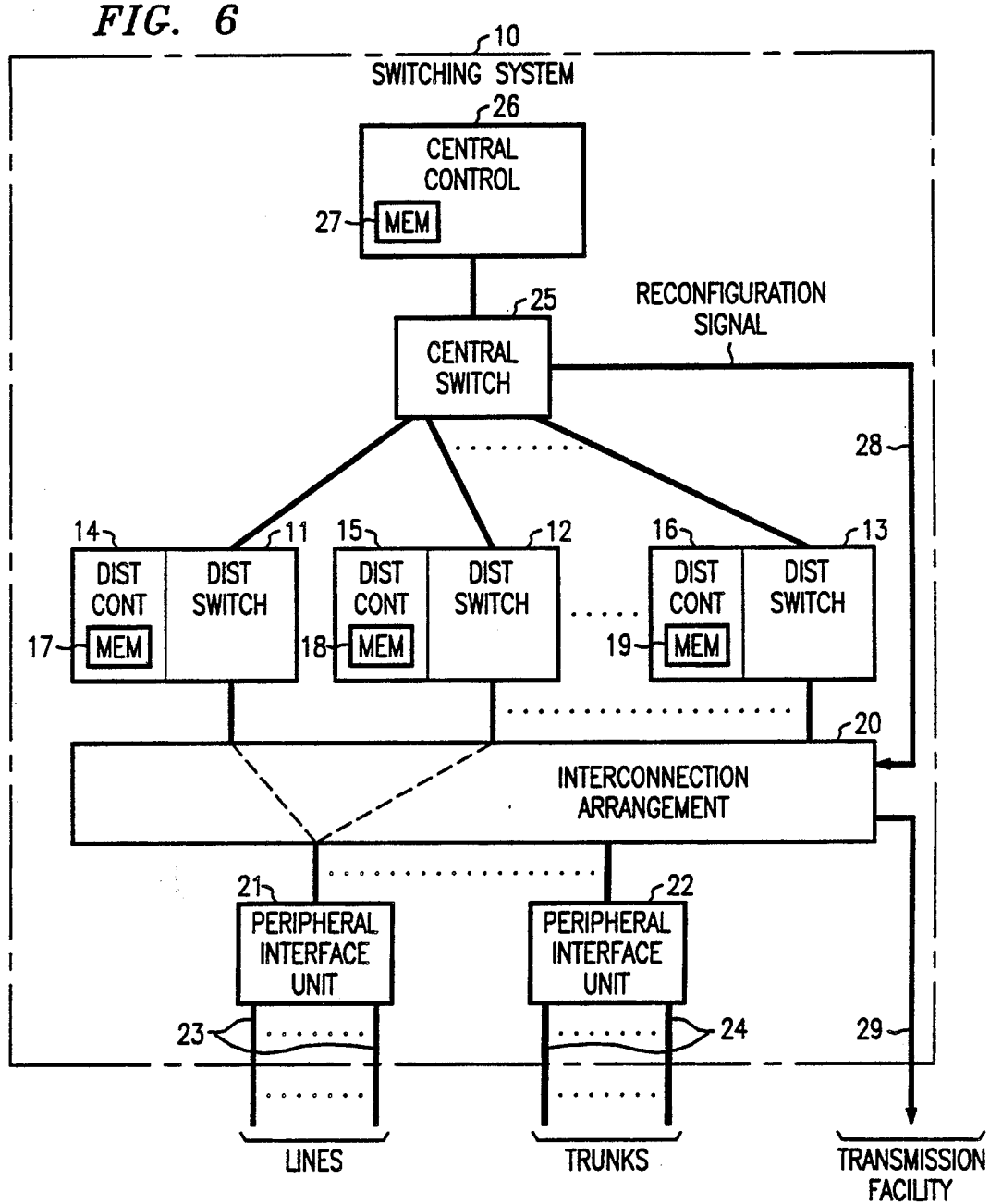
FIG. 6 is a diagram of an illustrative switching system which combines both distributed switching and distributed control and which is used to describe the reconfiguration of switching system functional units in accordance with the invention (the relationship between elements of FIG. 6 and FIGS. 4a and 4b is given in Table 2 herein)

| FIG. 6 | FIGS. 4a and 4b |
|---|---|
| central control 26 | AM 2052 |
| central switch 25 | CM 2055 |
| distributed switch 11, 12, 13 | TSIU 2031, 2022 |
| distributed control 14, 15, 16 | SMP 2041, 2042 |
| interconnection arrangement 20 | DNU 2059 |
| peripheral interface unit 21 | AIU 2117 |
| lines 23 | lines 2118 |
| facility 29 | facility 2060 |

An example of the call processing functions of the SMPs in CO-2000 (FIGS. 4a and 4b) is directory number translation. As described in the above-referenced S. Chang et al. U.S. Pat. No. 4,683,584, the directory number translation function is done in a manner allowing flexibility in assigning directory numbers to switching system ports by minimizing the magnitude of the storage facilities required in each control unit (SMP). Each SMP stores the complete directory number translation for certain directory numbers but stores an index referencing other SMPS for other directory numbers. The SMPs referenced are not necessarily the same ones that are associated with the ports defined by those other directory numbers. Thus the call setup sequence frequently involves three SMPs—the SMPs associated with the originating and terminating ports, and an intermediate SMP which stores the directory number translation information for the received directory number. However, AM 2052 maintains complete translation information for all directory numbers. Thus when AIU 2117 is moved from TSIU 2031 to TSIU 2032, AM 2052 modifies the translation data stored in all SMPs such that calls to the directory numbers of lines 2118 are properly translated and completed via TSIU 2032. The path hunt function required to determine a path through CM 2055 may be performed by AM 2052 as described in the above-referenced H. J. Beuscher et al. U.S. Pat. No. 4,322, 843, or may be cooperatively performed by the SMPs in the manner described in U.S. Pat. No. 4,805,166 issued to M. T. Ardon et al. on Feb. 14, 1989.

A further example of reconfiguration of switching system functional units in the CO-2000 architecture relates to remote switching model RSM-2000. Initially, RSM-2000 is connected via DNU 2059 to SM-2000 which operates as a host switching module in the manner of the above-reference M. M Chodrow et al. U.S. Pat. No. 4,550,404. This arrangement may be reconfigured by controlling DNU 2059 to connect RSM-2000 to SM-2000' and controlling SM-2000' to operate as the host switching module.

It is to be noted that AIU 2078 and TIU 2078 are in fixed association with TSIU 2031 in the CO-2000 architecture of FIGS. 4a and 4b. Alternatively, AIU 2078 and TIU 2078 are connected instead to DNU 2059, and are then reconfigurable by DNU 2059 to be connected to TSIU 2032 and to have calls to and from trunks 2111 and lines 2112 processed by SMP 2042.

An illustrative method of the invention is used in a central office wire center CO-2000 (FIGS. 4a and 4b0 including an interconnect arrangement (DNU 2059) terminating transmission facilities (2060, 2070) and further including a switching system comprising a plurality of units including peripheral units (AIUs, TIUs) for interfacing peripheral circuits (lines, trunks) with the switching system. The plurality of units also includes switching units (TSIUs 2031 , 2032) for providing switched communication among the peripheral circuits in response to calls to and from the peripheral circuits. According to the method, the interconnect arrangement interconnects the switching system and at least one multiplex of circuits (e.g., a DS1 multiplex comprising 24 circuits) of at least one of the transmission facilities. The interconnect arrangement also interconnects ones of the units of the system, and reconfigures the interconnection of units to perform load balancing or fault recovery. For example, the interconnect arrangement may interconnect a peripheral unit (AIU 2117) and a first switching unit (TSIU 2031) for switching calls to and from peripheral circuits (lines 2118). The interconnect arrangement then reconfigures the interconnection of units such that the peripheral unit (AIU 2117) and a second switching unit (TSIU 2032) are interconnected. The interconnect arrangement and the switching system are under common control.

Figure 8:
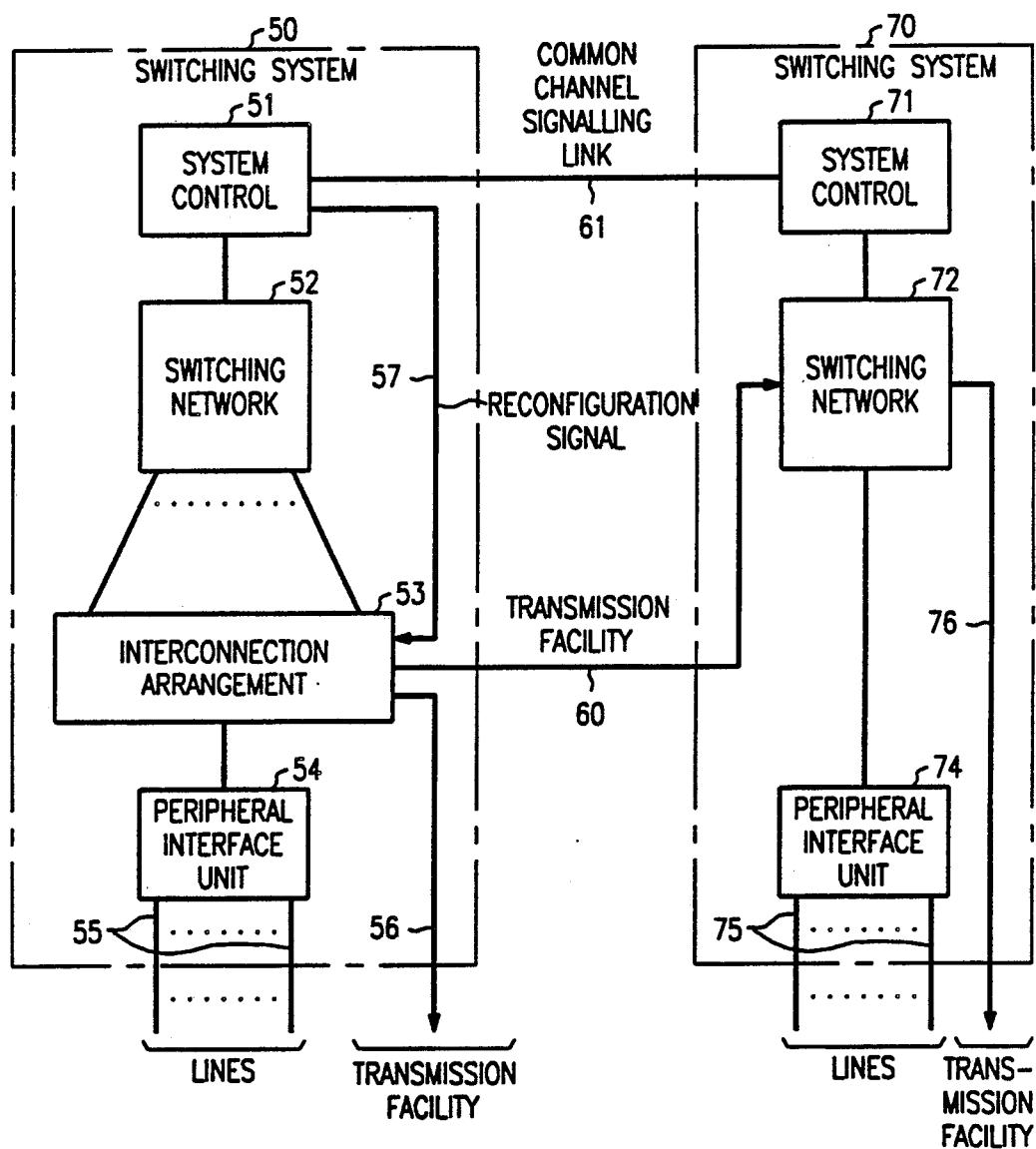
FIG. 8 is a functional representation of two central office wire centers of the type shown in FIGS. 4a and 4b.

An illustrative method of the invention is usable in an arrangement comprising first and second switching systems (50, 70) (FIG. 8) having a transmission facility (60) interposed therebetween. The first switching system (50) includes a first switching network (52) for providing switched connections between ones of a plurality of first peripheral circuits (lines 55). The first switching system further includes a first system control (51) for controlling the first switching network. The second switching system (70) includes a second switching network (72) for providing switched connections between ones of a plurality of second peripheral circuits (lines 75). The second switching system further includes a second system control (71) for controlling the second switching network. In response to a reconfiguration signal (received on link 57 from system control 51), a group of the first peripheral circuits (lines 55) are connected via the transmission facility (60) to the second switching network (72) (not through the first switching network (52)). The second system control (71) processes calls to and from the group of first peripheral circuits (lines 55), including controlling call signaling communication with the group of first peripheral circuits, and controlling the establishment of switched connections in the second switching network (72) to and from the group of first peripheral circuits. The second system control (71) processes calls to and from the group of first peripheral circuits (line s55), including controlling call signaling communication with the group of first peripheral circuits, and controlling the establishment of switched connections in the second switching network (72) to and from the group of first peripheral circuits. The information required to allow system control 71 to process calls to and form lines 55 is transmitted from system control 51 to system control 71 via a common channel signaling link 61. FIG 8 is a functional representation of two central office wire centers of the type shown in FIGS. 4a and 4b.

It is to be understood that the above-described embodiments are merely illustrative of the principles of the invention and that many variations may be devised by those skilled in the art without departing from the spirit and scope of the invention. For example, the described reconfigurations may also be effected when the fiber ring of add/drop units is used as the interconnect arrangement as in FIG. 5. It is therefore intended that such variations be included within the scope of the claims.

We claim:

1. A method for use in a switching system serving a plurality of peripheral circuits comprising at least one of lines and trunks, said system comprising switching means for providing switched connections between ones of said plurality of peripheral circuits, said switching means comprising a plurality of distributed switch means, and control means for controlling said switching means, said control means including a plurality of distributed control means each associated with one of said distributed switch means, said method comprising connecting a group of said peripheral circuits to a first one of said distributed switch means, said first distributed switch means being associated with a first one of said distributed control means, when said group of said peripheral circuits is connected to said first distributed switch means, said first distributed control means processing calls to and from said group of said peripheral circuits, including controlling call signaling communication with said group of said peripheral circuits, controlling the establishment of switched connections in said first distributed switch means to and from said group of said peripheral circuits, and cooperating with other of said distributed control means to extend, through other of said distributed switch means, switched connections in said first distributed switch means to and from said group of said peripheral circuits, in response to a reconfiguration signal, connecting said group of said peripheral circuits to a second one of said distributed switch means, said second distributed switch means being associated with a second one of said distributed control means, and when said group of said peripheral circuits is connected to said second distributed switch means, said second distributed control means processing calls to and from said group of said peripheral circuits, including controlling call signaling communication with said group of said peripheral circuits, controlling the establishment of switched connections in said second distributed switch means to and from said group of said peripheral circuits, and cooperating with other of said distributed control means to extend, through other of said distributed switch means, switched connections in said second distributed switch means to and from said group of said peripheral circuits.

2. A method in accordance with claim 1 wherein said switching means further comprises central switch means interconnecting said distributed switch means, said method further comprising said central switch means extending switched connections between ones of said distributed switch means.

3. A method in accordance with claim 1 further comprising said control means for controlling said switching means generating said reconfiguration signal.

4. A method in accordance with claim 3 wherein said generating is to effect load balancing within said switching system.

5. A method in accordance with claim 3 wherein said generating is to effect fault recovery within said switching system.

6. A method for use in an arrangement comprising first and second switching systems having a transmission facility interposed therebetween, said first switching system comprising first switching means for providing switched connections between ones of a plurality of first peripheral circuits, said first switching means comprising a plurality of first distributed switch means, said first switching system further comprising first control means for controlling said first switching means, said first control means comprising a plurality of first distributed control means each associated with one of said first distributed switch means, said second switching system comprising second switching means for providing switched connections between ones of a plurality of second peripheral circuits, said second switching means comprising a plurality of second distributed switch means, said second switching system further comprising second control means for controlling said second switching means, said second control means comprising a plurality of second distributed control means each associated with one of said second distributed switch means, connecting, in response to a reconfiguration signal, a group of said first peripheral circuits via said transmission facility to one of said second distributed switch means, and the one of said second distributed control means associated with said one of said second distributed switch means processing calls to and from said group of said first peripheral circuits, including controlling call signaling communication with said group of said first peripheral circuits, and controlling the establishment of switched connections in said one of said second distributed switch means to and from said group of said first peripheral circuits.

7. A method in accordance with claim 6, said connecting not being via any of said first distributed switch means.

8. A switching system serving a plurality of peripheral circuits comprising at least one of lines and trunks, said system comprising switching means for providing switched connections between one of said plurality of peripheral circuits, said switching means comprising a plurality of distributed switch means, control means for controlling said switching means, said control means including a plurality of distributed control means each associated with one of said distributed switch means, means for selectively connecting a group of said plurality of peripheral circuits to one of at least first and second ones of said distributed switch means, said first and second distributed switch means being associated with first and second ones of said distributed control means, respectively, means for storing data enabling said first distributed control means to process calls to and from said group of said peripheral circuits when said connecting means connects said group of said peripheral circuits to said first distributed switch means, said call processing by said first distributed control means including controlling call signaling communication with said group of said peripheral circuits, controlling the establishment of switched connections in said first distributed switch means to and from said group of said peripheral circuits, and cooperating with other of said distributed control means to extend, through other of said distributed switch means, switched connections in said first distributed switch means to and from said group of said peripheral circuits, and enabling said second distributed control means to process calls to and from said group of said peripheral circuits when said connecting means connects said group of said peripheral circuits to said second distributed switch means, said call processing by said second distributed control means including controlling call signaling communication with said group of said peripheral circuits, controlling the establishment of switched connections in said second distributed switch means to and from said group of said peripheral circuits, and cooperating with other of said distributed control means to extend, through other of said distributed switch means, switched connections in said second distributed switch means to and from said group of said peripheral circuits.

9. A switching system in accordance with claim 8 wherein said switching means further comprises central switch means for providing switch connections between ones of said distributed switch means.

10. A switching system in accordance with claim 9 wherein said central switch means is controlled by said plurality of distributed control means.

11. A switching system in accordance with claim 8 wherein said control means further comprises central control means for providing administrative functions for said system.

12. A switching system in accordance with claim 11 wherein said switching means further comprises central switch means for providing switched connections between ones of said distributed switch means.

13. A switching system in accordance with claim 12 wherein said central switch means is controlled by said central control means.

14. A switching system in accordance with claim 12 wherein said central switch means is controlled by said plurality of distributed control means.

15. A system comprising switching means comprising a plurality of distributed switch means including first distributed switch means connected to first peripheral communication circuits, and second distributed switch means connected to second peripheral communication circuits, control means for controlling said switching means, said control means including a plurality of distributed control means each associated with one of said distributed switch means, means for selectively connecting third peripheral communication circuits to one of at least said first and second distributed switch means, and means for storing data to enable said plurality of distributed control means to process calls to and from said first, second, and third peripheral communication circuits, and to enable the one of said distributed control means associated with said first distributed switch means to control said first distributed switch means to switch calls to and from said first and third peripheral communication circuits, when said connecting means connects said third peripheral communication circuits to said first distributed switch means, means for modifying said stored data to enable said plurality of distributed control means to process calls to and from said first, second and third peripheral communication circuits, and to enable the one of said distributed control means associated with said second distributed switch means to control said second distributed switch means to switch calls to and from said second and third peripheral communication circuits, when said connecting mean connects said third peripheral communication circuits to said second distributed switch means.

16. In combination, switching means for selectively interconnecting ones of a plurality of communication circuits, said switching means comprising a plurality of distributed switch means, interconnect means for selectively interconnecting ones of a plurality of communication circuit multiplexes, said plurality of multiplexes including a first multiplex connected to a first one of said distributed switch means, a second multiplex connected to a second one of said distributed switch means, and a third multiplex for conveying information to and from a plurality of peripheral circuits, and control means for controlling said switching means for establishing calls to and from individual ones of said peripheral circuits, said control means comprising first distributed control means associated with said first distributed switch means for controlling the establishment of calls to and from said individual ones of said peripheral circuits when the state of said interconnect means is that said first and third multiplexes are interconnected, and second distributed control means associated with said second distributed switch means for controlling the establishment of calls to and from said individual ones of said peripheral circuits when the stat of said interconnect means is that said second and third multiplexes are interconnected.

17. A method for use in a central office wire center including an interconnect arrangement terminating transmission facilities, said central office wire center further including a switching system comprising a plurality of units including peripheral units for interfacing peripheral circuits with said switching system, said peripheral circuits including at least one of lines and trunks, said plurality of units further including switching units for providing switched communication among said peripheral circuits in response to calls to and from said peripheral circuits, said method comprising said interconnect arrangement interconnecting said switching system and at least one multiplex of circuits of at least said facilities, said interconnect arrangement interconnecting ones of said plurality of units of said switching system, and said interconnect arrangement reconfiguring the interconnection of ones of said plurality of units of said switching.

18. A method in accordance with claim 17 wherein said reconfiguring is to perform load balancing among said plurality of units.

19. A method in accordance with claim 17 said reconfiguring is to perform failure recovery among said plurality of units.

20. A method in accordance with claim 17 wherein said interconnect arrangement interconnecting ones of said plurality of units of said switching system comprises interconnecting one of said peripheral units and a first one of said switching units for switching calls to and from ones of said peripheral circuits, and said reconfiguring comprises interconnecting said one peripheral unit and a second one of said switching units for switching calls to and from said ones of said peripheral circuits.

21. A method in accordance with claim 20 wherein said one peripheral unit and said first and second switching units are at said central office wire center.

22. A method in accordance with claim 20 wherein said first and second switching units are at said central office wire center and said one peripheral unit is at remote terminal at a distance from said central office wire center.

23. A method in accordance with claim 17 wherein said interconnect arrangement interconnecting ones of said plurality of units of said switching system comprises interconnecting one of said peripheral units and a first one of said switching units for switching calls to and from ones of said peripheral circuits, and said reconfiguring comprises interconnecting said one peripheral unit and a second switching system for switching calls to and from said ones of said peripheral circuits.

24. A method in accordance with claim 17 wherein said interconnect arrangement interconnecting said switching system and said at least one multiplex of circuits comprises said interconnect arrangement interconnecting a first one of said switching units and said multiplex of circuits, the circuits of said multiplex to be individually switched by said first switching unit, said method further comprising said interconnect arrangement reconfiguring interconnections such that a second one of said switching unit and said multiplex of circuits are interconnected, the circuits of said multiplex to be individually switched by said second switching unit.

25. A method in accordance with claim 17 wherein said interconnect arrangement interconnecting ones of said plurality of units of said switching system comprises interconnecting one of said peripheral units and a first one of said switching units for switching calls to and from ones of said peripheral circuits, said reconfiguring comprises interconnecting said one peripheral unit and a second switching system for switching calls to and from said ones of said peripheral circuits, said interconnect arrangement interconnecting said switching system and said at least one multiplex of circuits comprises said interconnect arrangement interconnecting said first switching unit and said multiplex of circuits, the circuits of said multiplex to be individually switched by said first switching unit, said method further comprising said interconnect arrangement reconfiguring interconnections such that said second switching system and said multiplex of circuits are interconnected, the circuits of said multiplex to be individually switched by said second switching system.

26. A method in accordance with claim 17 wherein said interconnect arrangement interconnecting ones of said plurality of units of said switching system comprises interconnecting first and second ones of said switching units for connecting calls to and from said second switching unit via said first switching unit, said first switching unit being a host switching unit at said central office wire center, an said second switching unit being a remote switching unit at a distance from said central office wire center, and said reconfiguring comprises interconnecting a third one of said switching units and said second switching unit for connecting calls to and from said second switching unit via said third switching unit, said third switching unit being a host switching unit at said central office wire center.

27. A method in accordance with claim 17 wherein said central office wire center further includes control means common to said switching system and said interconnect arrangement, and said method is performed under the control of said control means.

28. A method in accordance with claim 27 further comprising said control means controlling the establishment by said switching system of calls to and from individual ones of said multiplex of circuits.

* * * * *

UNITED STATES PATENT AND TRADEMARK OFFICE
CERTIFICATE OF CORRECTION

PATENT NO. : 5,105,420
DATED : April 14, 1992
INVENTOR(S) : Menachem T. Ardon and Gustavus H. Zimmerman, III It is certified that error appears in the above-identified patent and that said Letters Patent is hereby corrected as shown below:

Column 16, line 5, claim 8, "one" should be --ones--.

Column 17, line 68, claim 16, "stat" should be "state".

Column 18, line 16, claim 17, after "least" insert --one--;

Column 18, line 22, claim 17, after "switching" insert --system--.

Column 19, line 3, claim 24, "unit" should be --units--.

Column 20, line 9, claim 26, "an said" should be --and said--.

Signed and Sealed this

Thirty-first Day of August, 1993

*Attest:*

BRUCE LEHMAN

*Attesting Officer*   *Commissioner of Patents and Trademarks*